United States Patent [19]
Polcyn

[11] Patent Number: 5,905,775
[45] Date of Patent: May 18, 1999

[54] STATISTICAL DISTRIBUTION OF VOICE MAIL MESSAGES

[75] Inventor: Michael J. Polcyn, Allen, Tex.

[73] Assignee: InterVoice Limited Parternership, Reno, Nev.

[21] Appl. No.: 08/739,258

[22] Filed: Oct. 29, 1996

Related U.S. Application Data

[63] Continuation-in-part of application No. 08/529,616, Sep. 18, 1995, Pat. No. 5,699,412.
[51] Int. Cl.⁶ ...................................................... H04M 1/64
[52] U.S. Cl. ...................................... 379/88.18; 379/88.22; 379/93.07
[58] Field of Search ................................ 379/67, 88, 89, 379/93.01, 93.07, 88.18, 88.22, 88.23, 88.24, 88.25, 88.27

[56] References Cited

U.S. PATENT DOCUMENTS

| | | | |
|---|---|---|---|
| 5,029,199 | 7/1991 | Jones et al. | 379/89 |
| 5,623,538 | 4/1997 | Petty | 379/67 |
| 5,781,615 | 7/1998 | Bales et al. | 379/93.01 |

*Primary Examiner*—Fan S. Tsang
*Attorney, Agent, or Firm*—Fulbright & Jaworski L.L.P.

[57] ABSTRACT

There is disclosed a distributed architecture messaging recording system that employs a hierarchy of storage nodes to distribute system utilization across the various nodes of the systems so as to minimize the likelihood of system blockages. The hierarchy may be supplemented by relocation of messages directed toward particular users to a subset of the various nodes. Message relocation may utilize a statistical engine monitoring access to the system, by both system subscribers and by callers leaving messages for the subscribers, to select a subset of the various nodes upon which to relocate messages as well as particular subscribers for which to relocate messages.

66 Claims, 3 Drawing Sheets

5,905,775

STATISTICAL DISTRIBUTION OF VOICE MAIL MESSAGES

REFERENCE TO RELATED APPLICATION

The present application is a continuation-in-part of U.S. Pat. No. 5,699,412, entitled SYSTEMS AND METHODS FOR STATISTICS DISTRIBUTION OF MESSAGES IN A MESSAGE RECORDING SYSTEM, filed Sep. 18, 1995 as application Ser. No. 08/529,616 and issued Dec. 16, 1997.

TECHNICAL FIELD OF THE INVENTION

The present invention relates to a communication system used for handling message storage and, in particular, to a distributed architecture messaging system that employs a hierarchy of storage nodes to distribute system utilization throughout the system and to minimize system blockages.

BACKGROUND OF THE INVENTION

Recent years have seen a great increase in the number and diversity of message or information storage systems as more and more people use such systems in business and personal applications. Many such systems, such as E-mail, voice mail, fax, etc., are designed as part of a central office switch in the switched public network, while others are designed to operate in conjunction with a private branch exchange (PBX). In either case, message storage systems typically include one or more voice or data processing units coupled to the switched public network through a finite number of telephone lines. These data processing units are dedicated to serving a group of subscribers, usually employees of the business which owns the PBX. Individual subscribers are usually assigned to a specific processing unit and messages for each subscriber are typically stored in a local storage device connected to the dedicated data processing unit. Normally, groups of data processing units share access to a common storage device.

During periods of heavy usage, the numerous data processing units of a PBX may consume all of the available bandwidth of the common storage device. In such a case, new incoming data for a particular subscriber will not be allowed to be stored because the dedicated processing unit for that subscriber is not able to access the common storage device. Similarly, if a subscriber attempts to retrieve data messages from the common storage device during a period of high usage, the subscriber will be unable to obtain the messages because there is no available bandwidth with which to access the storage device.

Some prior art systems have attempted to avoid the bandwidth limitations of common storage devices by employing a front-end switch which directs incoming calls for a specific subscriber to the dedicated processing unit assigned to that subscriber or, if the dedicated processing unit is busy, to an alternate processing unit. The alternate processing unit will handle the call and store the data messages on an alternate storage device associated with the alternate processing unit.

The data message may then be transferred across an internal network or data bus from the alternate storage device to the dedicated storage device coupled to the dedicated processing unit for that particular subscriber. One such system is disclosed in U.S. Pat. No. 5,029,199, entitled "Distributed Control and Storage for a Large Capacity Messaging System" to Jones et al., which patent is hereby incorporated by reference in the present disclosure.

This solution to the bandwidth limitations of memory storage devices during periods of high traffic in a PBX is nonetheless inadequate. While the prior art messaging systems enable a caller to leave a mail message for a subscriber even if that subscriber's dedicated processing unit is busy, the prior art systems fail to anticipate these situations or attempt to avoid them. Furthermore, if a subscriber calls in to retrieve mail messages and the messages have been distributed to alternate storage devices, the message system must gather the numerous messages from the different storage devices and relay them across the internal network to the processing unit handling the subscriber's message retrieval. This may introduce latencies from several seconds up to a minute or more, depending upon the volume of traffic on the network.

There is therefore a need in the art for a messaging system that distributes utilization across system components thereby avoiding system blockages to individual processors.

There is a further need in the art for a messaging system that, although distributing utilization across system components, consolidates subscribers' messages to decrease latencies experienced in retrieval of a particular subscriber's messages.

There is a still further need in the art for a storage processing system which statistically monitors the frequency and duration of mail messages left by callers for each subscriber and the frequency and duration of mail retrievals by each subscriber for utilization in consolidation of messages.

SUMMARY OF THE INVENTION

The problems inherent in the prior art have been solved by the present invention which provides a hierarchy or rank of storage devices utilized to distribute inbound messages across the various components of the messaging system resulting in a statistical distribution of system utilization over time in order to avoid system blockages.

In a preferred embodiment, the present invention further provides consolidation or redistribution of messages, directed toward a particular user, stored on various storage devices to a select few storage devices in order to further avoid system blockages and to minimize latencies experienced in retrieval of the messages.

A preferred embodiment of the present invention also provides a statistical engine that monitors the messaging traffic in a storage system, determines which subscribers are high volume users of the system and consolidates messages directed toward the high volume users among storage devices in order to minimize system access blockages.

A preferred embodiment of the present invention further provides a statistical engine that monitors message traffic in a storage and retrieval system, determines the times of day in which the level of access to a particular processing unit and/or storage device is likely to be great enough to cause an access blockage to that processing unit or storage device and, accordingly, relocates messages directed to some of the subscribers to other processing units.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
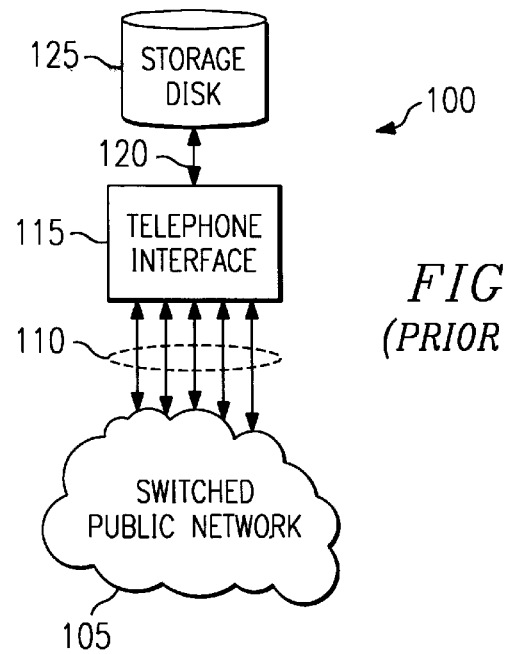
FIG. 1 illustrates a block diagram of a simple prior art message storage and retrieval system.

FIG. 1 depicts a simple voice mail system 100 in accordance with the prior art. Incoming telephone calls are received from switched public network 105 through telephone lines 110 by telephone interface 115. Telephone interface 115 typically includes one or more voice processing units which are dedicated to serve a predetermined number of telephone lines 110 and a particular group of subscribers. Each of the voice processing units within telephone interface 115 functions as a home base for its assigned subscribers and stores voice mail messages for those subscribers on storage disk 125 through bus 120.

Two sources of system blockages are obvious in FIG. 1. First, if too many calls are received for subscribers assigned to the same voice processing unit within telephone interface 115, the voice processing unit will reach its maximum limit and no further incoming calls to those subscribers or any other subscriber dedicated to that particular voice processing unit can be handled. New callers will therefore be unable to leave voice mail messages for any subscribers serviced by the busy voice processing unit.

Secondly, all of the voice processing units in telephone interface 115 compete for access to bus 120 when the voice processing units attempt to store or retrieve voice mail messages to or from storage disk 125. Therefore, the bandwidth limitation of bus 120 serves as a bottle neck to voice mail system 100 whenever too many voice processing units attempt to store or retrieve voice messages through bus 120 simultaneously.

Figure 2:
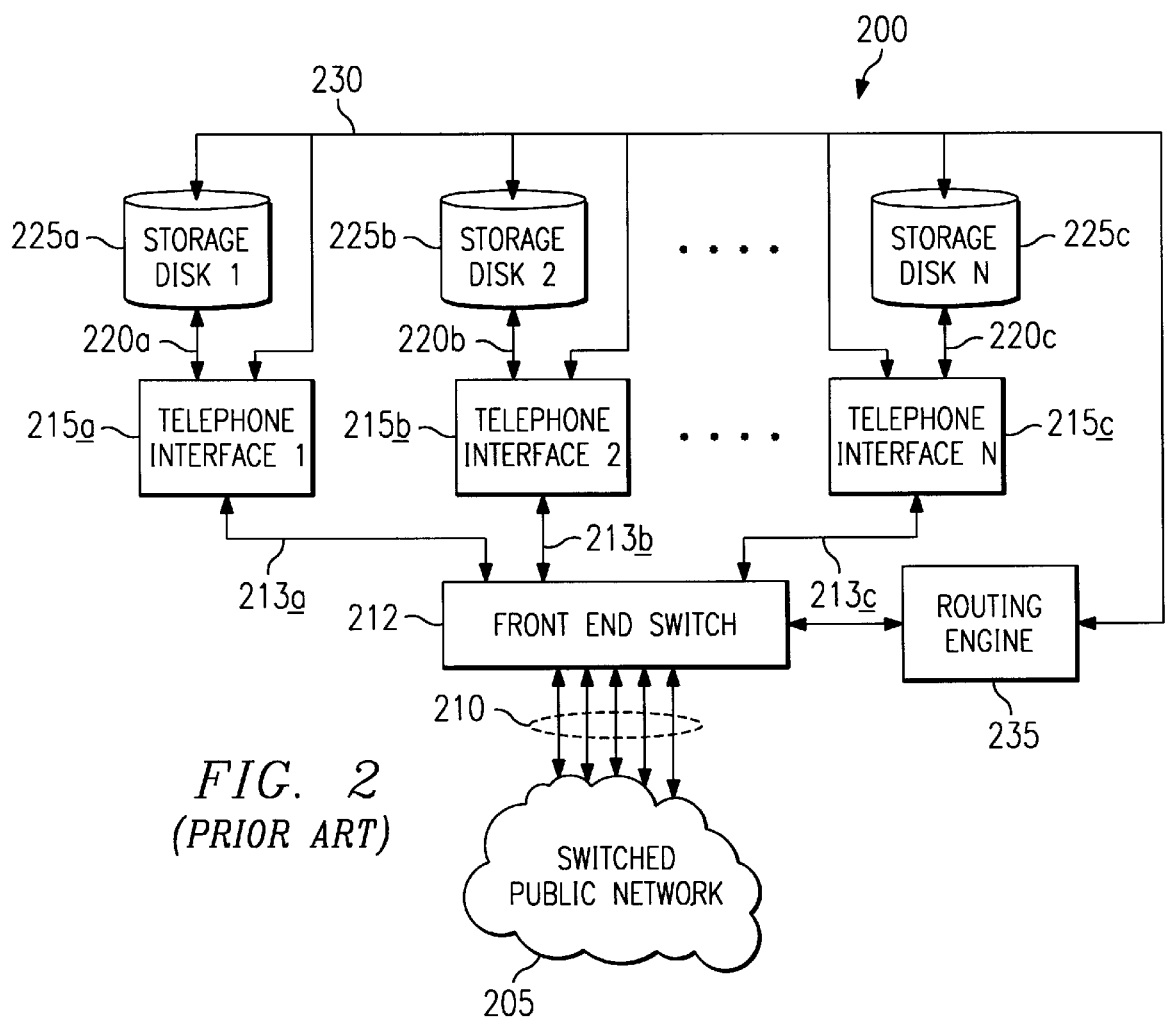
FIG. 2 illustrates a block diagram of a prior art messaging system employing a front end switch and a network to distribute messages across a distributed architecture.

FIG. 2 depicts an improved voice mail system 200 in accordance with the prior art U.S. Pat. No. 5,029,199 to Jones et al. Prior art voice mail system 200 employs a front end switch 212 to connect to telephone lines 210 from the switched public network 205. Voice mail system 200 employs routing engine 235 to direct incoming calls to telephone interfaces 215a–c and storage disks 225a–c.

Voice mail system 200 represents the typical architecture used by a large corporate user or other large entity. As incoming calls are received from switched public network 205, the calls are handled by one or more voice processing units (VPUs) within telephone interfaces 215a–c that serve as dedicated "home bases" to particular subscribers. For example, the voice processing units in telephone interface 215a (telephone interface 1) may handle the voice mail messages for subscribers 1–1000 of the entity which uses voice mail system 200. Under normal operations, all voice mail messages sent to or retrieved from storage disk 225a (storage disk 1) for subscribers 1–1000 are handled entirely by the voice processing units in telephone interface 1.

Similarly, voice processing units in telephone interface 2 and storage disk 2 are the dedicated "home base" for subscribers 1001–2000 of voice mail system 200. Also, voice processor units in telephone interface N and storage disk N are the dedicated "home base" for subscribers 2001–3000.

When an incoming call is received on telephone lines 210, routing engine 235 identifies the subscriber to whom the incoming call is directed. Routing engine 235 may identify the subscriber based on the telephone number dialed by the incoming caller or, alternatively, the incoming caller may be prompted by a voice-scripted message to enter the extension number of a subscriber on the DTMF keypad of a push button telephone. In either case, routing engine 235 determines which voice processing unit is assigned to the identified subscriber and directs front end switch 212 to switch the incoming call across communication lines 213a–c to the appropriate telephone interface 215a–c. In a preferred embodiment, routing engine 235 coordinates the routing of calls based on conventional Simplified Message Desk Interface (SMDI) information packets from switched public network 205 or PBX.

To avoid the system blockages that are inherent in voice mail system 100 depicted in FIG. 1, voice mail system 200 includes an internal bus or network 230 that typically includes both a data bus and a voice bus. When all of the voice processing units in a particular telephone interface 215a–c are busy processing calls, any new incoming calls directed to a subscriber serviced by a busy VPU is re-directed by routing engine 235 to a remote VPU in a different telephone interface 215a–c using front end switch 212.

For example, if telephone interface 1 is handling a high volume of calls such that the "home" voice processing unit for subscriber 1 is unavailable in telephone interface 1, or bus 220a to storage disk 1 is at its maximum capacity, a new incoming call to subscriber 1 will not be able to access storage disk 1 in order to leave a voice message for subscriber 1. When such a busy condition is detected, the voice processing units in telephone interface 1 send a data message to routing engine 235 across network 230, which routes control data and messages between routing engine 235 and the voice processing units and storage disks. The new incoming call for subscriber 1 is then routed to, for example, a remote voice processing unit in telephone interface 2 which handles the call and stores the voice message on storage disk 2.

Similarly, if subscriber 1 calls to retrieve voice mail messages while subscriber 1's home voice processing unit is busy or when bus 220a to storage disk 1 is at maximum capacity, routing engine 235 re-routes subscriber 1 to a remote VPU which will handle subscriber 1's message retrieval. In such a case, the remote VPU will access storage disk 1 through network 230 and retrieve the voice mail messages for subscriber 1.

Routing engine 235 maintains a master record of voice mail messages left for each subscriber to voice mail system 200 so that each subscriber can retrieve voice messages handled by the subscriber's home voice processing unit and by remote voice processing units that have received and stored voice mail messages for the subscriber. If subscriber 1 calls into subscriber 1's home VPU in telephone interface 1 to retrieve messages, messages that were previously stored in storage disk 2 and storage disk N by remote VPUs are transferred to storage disk 1 across network 230 during the voice mail retrieval by subscriber 1. Likewise, if subscriber 1 is connected to a remote VPU in telephone interface 2 to retrieve subscriber 1's messages, voice mail messages that were previously stored in storage disk 1 and remote storage disk N will be transferred to storage disk 2 across network 230.

In this manner, voice mail messages may always be left or retrieved in voice mail system 200 so long as at least one voice processing unit is available to handle an incoming call. Incoming calls to voice mail system 200 are preferably routed to the home voice processing unit assigned to each subscriber. In the event that the home VPU is busy, the incoming call may be directed to the least busy remote voice processing unit in one type of distribution scheme. In another distribution scheme, the incoming call may be re-routed to the first remote voice processing unit available on a list with a predetermined order of remote voice processing unit selections.

After a voice message is stored by either a home voice processing unit or a remote voice processing unit, the location of the voice mail message is sent to routing engine 235 so that the message may later be retrieved when the subscriber calls to retrieve voice messages. Voice processing units located in telephone interfaces 1–N and storage disk 1–N may be located in widely separated geographical areas. Therefore, the elements of voice mail system 200 may be distributed among different office facilities.

Typically the assignment of subscribers to a VPU is made by such determinations as subscribers being physically located in a geographic area or being assigned similar work tasks. Such considerations do not take into account the utilization of the system by a particular subscriber. Therefore, it is very common for subscribers utilizing the system heavily to be assigned to one VPU while other subscribers, utilizing the system only lightly, to be assigned a different VPU.

It becomes quite apparent that such subscriber assignment results in an uneven distribution of system utilization among the various components of the system. Such uneven utilization may result in full bandwidth use of some system components with little or no use at other system components. Therefore a drawback to voice mail system 200 is that such a system fails to anticipate and compensate for uneven distribution of utilization across the telephone interface and storage disk combinations, or storage nodes, of the system resulting in situations likely to cause access blockages to storage disks or VPUs. It is therefore preferable that utilization of the individual components of the system be substantially uniform over time to avoid situations likely to result in access blockages to storage disks or VPUs in the first place. This will increase the efficiency of the handling of voice mail messages by the voice mail system.

Figure 3:
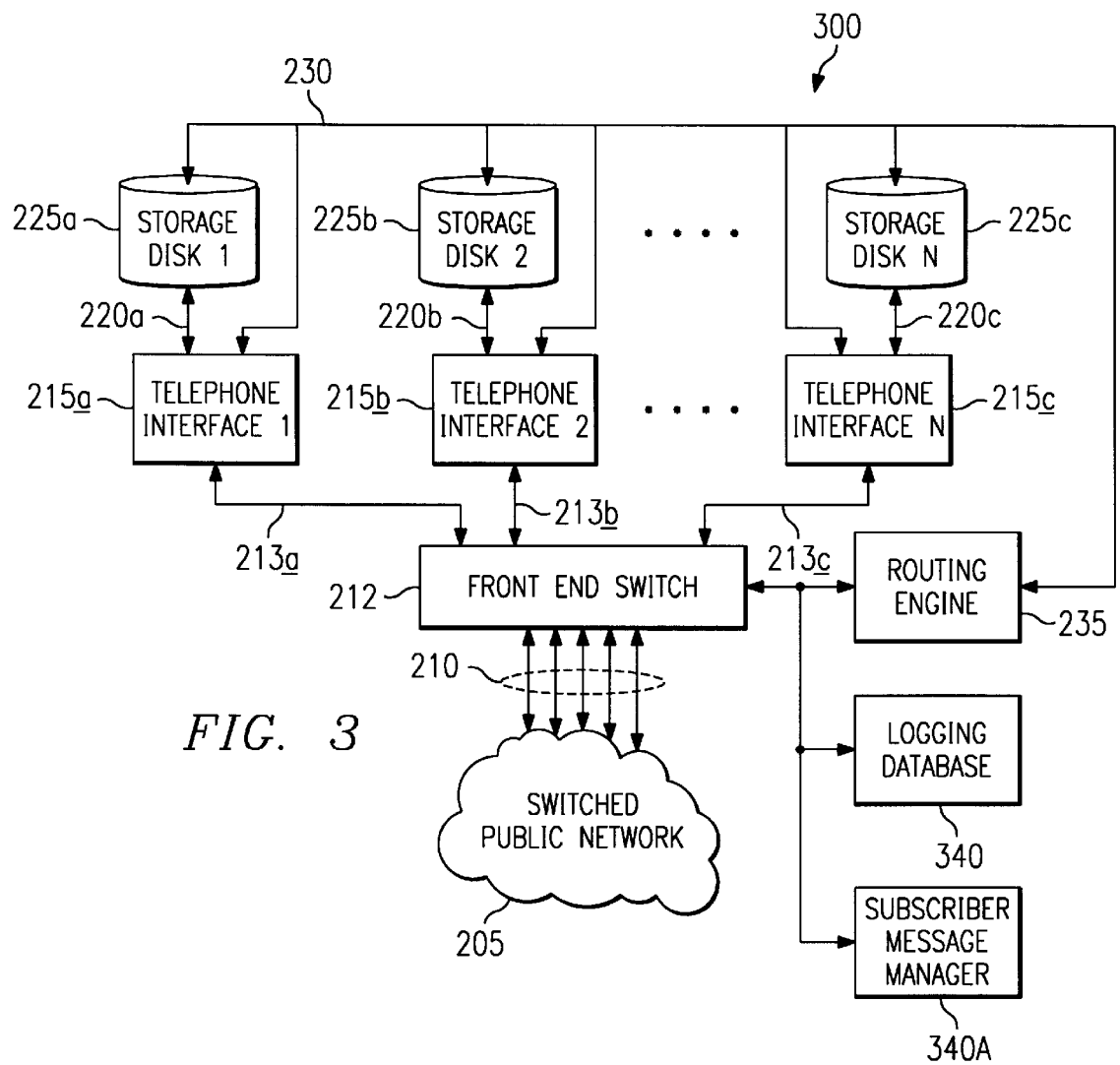
FIG. 3 illustrates a block diagram of a messaging system in accordance with the present invention.

FIG. 3 depicts an improved voice mail system 300 in accordance with the present invention. Voice mail system 300 is in nearly all operational respects identical to voice mail system 200 previously described in FIG. 2. However, voice mail system 300 includes routing engine 235 with an improved routing algorithm.

Figure 5:
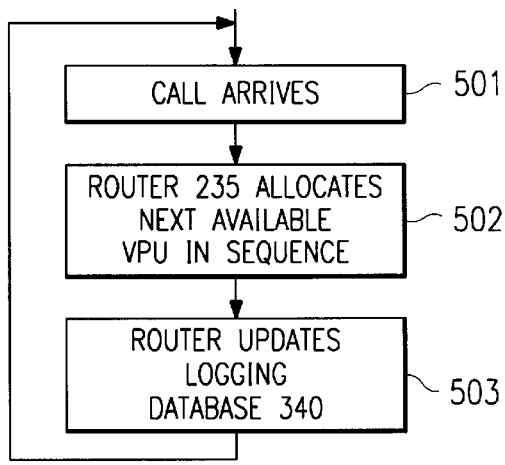
FIG. 5 illustrates a flow diagram of the initial distribution of messages by the routing engine of the present invention.

According to the routing algorithm of the present invention, as illustrated in FIG. 5, upon arrival of an incoming call containing a message (box 501), routing engine 235 routes messages to be stored within system 300 to the next available VPU in a predetermined sequence (box 502). Thereafter, routing engine 235 updates information stored within logging database 340 to include information associated with this message (box 503).

This routing algorithm results in a "round robin" utilization of the phone interfaces and associated storage disks. In example, the first message, regardless of the specific subscriber to whom the message is intended, might be routed to the first available VPU in telephone interface 1 (box 215*a*). Thereafter, the second message would be routed to the first VPU in telephone interface 2 (box 215*b*), and the Nth message to the first available VPU in telephone interface N (box 215*c*). Thereafter, message N+1 would be routed to the first available VPU in telephone interface 1 in round robin fashion.

By taking messages on an as-they-come basis, and just going in a round robin fashion from telephone interface to telephone interface, over time you get a statistical distribution of the available bandwidth of the system without having to go through and calculate any specific user patterns. Therefore, the present invention achieves many of the advantages of a statistically driven system by a much simpler implementation.

It shall be understood that, although the above sequence of messages illustrates routing resulting in messages recorded on each telephone interface sequentially, the round robin method of the present invention may not always produce such result. Actual utilization of system 300 will involve both the recording of messages, the duration being such that a complete round robin may be made before recording is complete, as well as retrieval of messages by subscribers substantially concurrent with recording of incoming messages. Therefore, the preferred embodiment of routing engine 235 monitors activity of each VPU within each telephone interface of system 300 to determine if it is available for message routing prior to routing a message in round robin fashion. If all VPUs in the next telephone interface in the round robin sequence are busy, routing engine 235 will route the message to the next telephone interface in the round robin sequence.

It shall be appreciated that, although a round robin sequence following numerical identification of the telephone interfaces of system 300 has been discussed, a round robin sequence may be defined in any manner deemed efficient. For example, where components of system 300 are spread out geographically, it may be efficient to define a round robin sequence where telephone interfaces located in closest geographic proximity are adjacent to one another in the round robin sequence. Such a sequence may make more efficient use of connections comprising bus 230 of system 300. Likewise, the sequence in which the individual VPUs of each telephone interface are accessed may be selected to result in the most advantageous utilization.

Of course, access to particular ones of the phone interfaces and associated storage disks may be disproportionate, if desired. For example, where a particular storage disk is capable of a greater bandwidth than other storage disks in the system, this particular storage disk may be accessed proportionately to this increased bandwidth. As such, this particular storage disk would be referenced in the access sequence disproportionately to other storage disks. However, it shall be appreciated that such disproportionate access still results in a statistical distribution over time of the individual component's capabilities.

In addition to the above discussed improved routing, engine, system 300 further includes logging database 340 and subscriber message manager (SMM) 340A, both of which are coupled to routing engine 235. SMM 340A provides message management by utilizing information stored within logging database 340 in conjunction with a management algorithm of SMM 340A.

Logging database 340 contains circuitry and programming for storing information identifying a subscriber or subscribers with whom a particular message stored within system 300 is associated. Additionally, logging database 340 stores information sufficient to identify the particular storage disk within system 300 that the message is stored upon.

Figure 4:
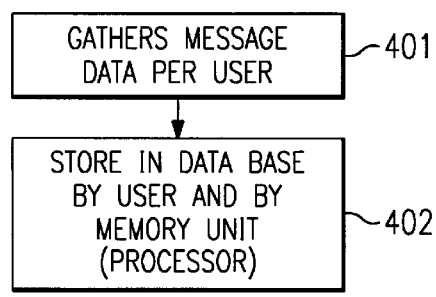
FIG. 4 illustrates a flow diagram of the storage of message data by the logging database of the present invention.

Referring to FIG. 4, the gathering of message data by logging database 340 is illustrated as box 401. Logging database 340 receives this information initially from routing engine 235 substantially simultaneously with the initial routing and storage of the message. Thereafter, logging database stores this information to aid the later retrieval of the messages by system 300 (box 402). However, it shall be appreciated that it may be advantageous for logging database 340 to include circuitry and programming to itself monitor the routing of the messages. Such an embodiment of logging database 340 may be advantageous, for example, where routing engine 235 lacks the ability to communicate such information to logging database 340.

Information stored by logging database 340 may be stored in various formats to enable its utilization not only for message retrieval but for other functions, such as determining system capacity or the system capacity utilized by a particular subscriber's messages. Furthermore, any such information is stored in a form suitable for utilization by SMM 340A in subsequent operations to retrieve or relocate the stored messages.

SMM 340A contains circuitry and programming for organizing specific messages for playback by the associated subscriber. In a preferred embodiment, SMM 340A message organization occurs as an offline process, hereinafter offline message organization. This offline process may occur at a predetermined time, such as when system 300 is utilized the least, or may occur in the background, as utilization of system 300 allows. Message organization by the offline process relocates a particular subscriber's messages to result in the messages being stored on fewer disk storage units than result from the round robin sequence. Preferably, SMM 340A ascertains the storage requirements of a particular subscriber's messages and then determines the storage disk, or fewest combinations thereof, having sufficient storage space upon which to consolidate the messages.

It shall be understood that the relocation of a particular subscriber's messages within system 300 may utilize statistical use analysis as disclosed in the above referenced parent patent application, herein incorporated by reference. It shall be appreciated that statistical use analysis requires the monitoring of access to voice mail system 300 as accomplished by the statistical engine disclosed in the parent application. Therefore, in an alternative embodiment, SMM 340A may include a statistical engine or, alternatively, a statistical engine may be in communication with SMM 340A.

It shall be understood that consolidation of subscribers' messages may be accomplished for select subscribers, only or may be accomplished for all subscribers. Consolidation for select subscribers may be useful, for example, in situations where it is determined that a particular subscriber seldom asks for messages until a certain time, such as a peak system utilization time such as 8:00 a.m., and a large number of messages are stored prior to that time for that subscriber. In such a situation, relocating the stored messages during system low activity periods prior to 8:00 a.m. will result in minimum latency in retrieving the messages by the subscriber, while still taking advantage of the round robin sequence of recording the messages. Furthermore, by relocating the messages only for select subscribers, preferably those who would experience the most benefit, duplicative system activity required to relocate the messages may be kept at a minimum.

Figure 6:
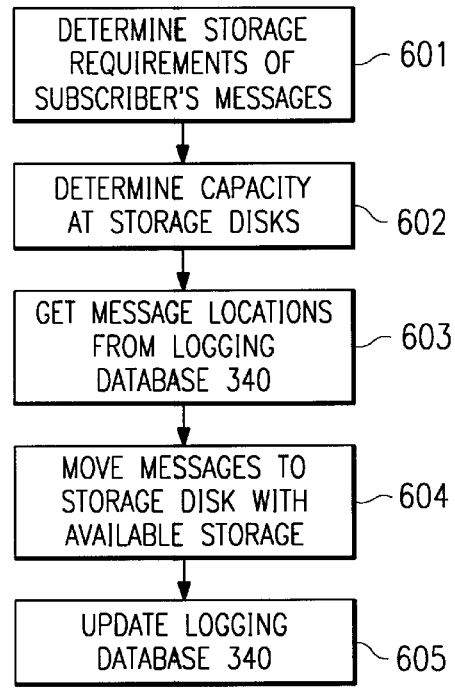
FIG. 6 illustrates a flow diagram of the redistribution of messages by the subscriber message manager of the present invention.

FIG. 6 illustrates the steps of a preferred embodiment of the organization process of SMM 340A. The process begins with SMM 340A determining the storage requirements of subscriber's messages (box 601). SMM 340A also determines remaining capacity at storage disks 220a–c (box 602). Preferably, SMM 340A utilizes information stored within logging database 340 to make these determinations to minimize utilization of communication buses coupled to the storage disks. However, SMM 340A may actually poll each device to determine any remaining capacity, as well as storage requirements of a particular subscriber, if desired.

SMM 340A retrieves information indicating the location of messages and to whom the message is intended from logging database 340 (box 603). This information is to be subsequently utilized by SMM 340A to retrieve and relocate messages recorded within system 300 (box 604). Thereafter, the information stored within logging database 340 is updated to reflect changes to the stored messages by SMM 340A (box 605).

It shall be understood that the steps illustrated in FIG. 6 may be utilized to relocate/consolidate messages for all subscribers of system 300. In such an embodiment, SMM 340A may relocate all messages identified for receipt by a specific subscriber, as a unit, before proceeding to relocate messages for another subscriber. Alternatively, SMM 340A may determine the current and destination storage disks for each subscriber's messages and thereafter retrieve messages from the storage disks, regardless of the subscriber identified as the recipient, to minimize utilization of system 300 required for message relocation.

It shall further be understood that the above discussion disclosing a method of relocating messages for all subscribers is equally adaptable for use in relocation of messages identified for receipt by only select subscribers. Of course, such utilization requires identification of the select subscribers by such means as input by an operator or by automatic determination by system 300. Such automatic determination of the select subscribers may be accomplished in conjunction with the above discussed statistical engine making such determinations as which subscribers utilize the system according to certain criteria, or which subscribers may benefit the most from consolidation of their messages. These determinations may be made by statistically analyzing the usage patterns of the subscribers as disclosed in the above incorporated parent patent application.

SMM 340A message organization may also occur upon a subscriber's request for message playback, resulting in pseudo random access of the disk storage units, hereinafter referred to a random access message organization. Here each storage disk storing a message associated with that subscriber, as indicated by logging database 340, is accessed for playback of a subscriber's messages. The process of accessing a particular storage disk containing a subscriber's messages may be repeated for each message recorded for that subscriber in logging database 340, or may be repeated in batch for each disk storage unit upon which messages for that subscriber are recorded. It shall be appreciated that while repeating the connection step in batch for each disk storage unit may decrease the latency period for retrieving stored messages by decreasing the number of storage disk accesses required, it may result in messages being retrieved in a sequence other than in which they were recorded.

Random access message organization may be utilized in conjunction with off line message organization where, for example, only select subscribers have been chosen for off line message organization. Here subscribers, other than the select subscribers, will utilize this random access method of organization, while the select subscribers utilize the off line method. Additionally, as the off line method may occur in the background, system utilization permitting, even subscribers intended to utilize the off line method may in fact utilize the random access method in the case where the off line method has not organized the subscriber's messages prior to the subscriber's request for message playback.

Alternatively, the random access method may be utilized exclusively for all subscribers with no off line organization. Exclusive utilization of the random access organization method may be advantageous in situations where latency experienced in retrieving messages stored throughout system 300 is not a concern.

However, it should be appreciated that regardless of the method by which a subscriber's messages are organized, that the retrieval of the messages is accomplished by SMM 340A in the same manner. The utilization by SMM 340A of logging database 340 to locate a subscriber's messages, as described in detail below, provides the common reference necessary for utilization of a single retrieval scheme regardless of when and how message organization is accomplished.

Figure 7:
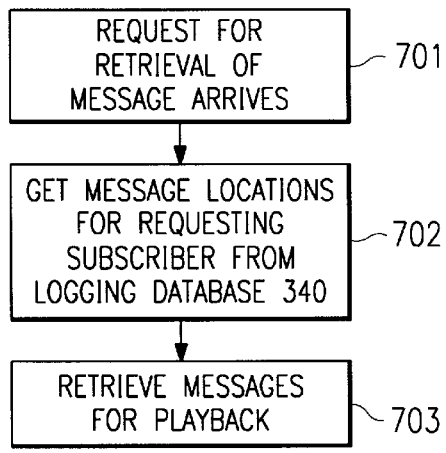
FIG. 7 illustrates a flow diagram of the retrieval of messages according to the present invention.

The steps for retrieving a message by SMM 340A are shown in FIG. 7. As illustrated in FIG. 7, SMM 340 receives a request for retrieval of a subscriber's messages (box 701) and thereafter gets the locations of those messages within system 300 from logging database 340 (box 702). Information retrieved from logging database 340 provides SMM 340A the ability to locate and retrieve the messages, wherever stored within system 300, for subscriber playback (box 703).

In an embodiment where off line organization is utilized, as messages are relocated within system 300, logging database 340 is updated with the current location of such messages. Therefore, the steps discussed above in reference to FIG. 7 are equally suitable for retrieving messages whether organized by the random access method or the off line method of the present invention.

Furthermore, an advantage is realized by the utilization of logging database 340 regardless of organization method as, even where SMM 340A has not been able to consolidate all of a particular subscriber's messages, retrieval of the messages by a single algorithm is possible. Moreover, substantial decreases in latency experienced in retrieving the messages may still be enjoyed as those messages that are relocated will be accessed from their new consolidated storage location as indicated by logging database 340.

It should also be noted that while the preferred embodiment is voice mail applications, the system can work for mixed applications, such as information packets associated with fax and/or E-mail communication.

Although the present invention and its advantages have been described in detail, it should be understood that various changes, substitutions and alterations can be made herein without departing from the spirit and scope of the invention as defined by the appended claims.

What is claimed is:

1. A message storage system for retrievably storing a plurality of received messages on a plurality of storage nodes, said system comprising:

means for accessing said storage nodes in a predetermined hierarchy, wherein said hierarchy comprises a particular order to be used when accessing one or more of said plurality of storage nodes;

means for determining whether an accessed one of said plurality of message storage nodes has a capacity to store one or more of said received messages;

means for storing one or more of said received messages on a storage node having said capacity to store; and means for relocating stored messages associated with a particular user from one or more of said storage nodes to a designated storage node according to a statistical usage summary for said particular user.

2. The system set forth in claim 1, wherein:

said means for storing stores said received messages on a next available storage node.

3. The system set forth in claim 2, wherein storage of said plurality of messages results in a substantially uniform distribution of utilization of said plurality of storage nodes over time.

4. The system set forth in claim 2, further comprising:

means for retrieving said stored messages associated with said particular user.

5. The system set forth in claim 4, wherein said retrieving means are operable with said relocating means.

6. The system set forth in claim 1, wherein said hierarchy defines a round robin access sequence of said plurality of storage nodes.

7. The system set forth in claim 1, wherein said hierarchy includes each one of said plurality of storage nodes an equal number of times.

8. The system set forth in claim 1, wherein said hierarchy includes particular ones of said plurality of storage nodes a disproportionate number of times.

9. The system set forth in claim 1, wherein said hierarchy is determined at least in part by a physical location of particular ones of said storage nodes.

10. The system set forth in claim 1, further comprising a communication bus coupling said plurality of storage nodes and said system, and wherein said hierarchy is determined at least in part by a determination of efficient use of said communication bus.

11. The system set forth in claim 1, wherein said relocating means is operable for each user.

12. The system set forth in claim 1, wherein said relocating means is operable only for select ones of said users.

13. The system set forth in claim 1, wherein said relocating means comprises:

means for detecting an initiation and a termination of access to said plurality of storage nodes, said detecting means measuring a duration of each said access and recording a time of day for each said access, thereby generating the statistical usage summary for each user of said plurality of users and for each said message storage node; and means for storing said statistical usage summary for each user of said plurality of users and for each said message storage nodes.

14. The system set forth in claim 13, wherein said relocating means further comprises:
  means for selecting said at least one of said plurality of storage nodes that is operable with said statistical summary storage means.

15. The system set forth in claim 13, wherein said relocating means is operable only for select users ones of said one or more users, said select users being selected according to said stored statistical usage summary.

16. A method for retrievably storing a plurality of messages comprising the steps of:
  establishing an access sequence for a plurality of message storage nodes;
  selecting at least one of a plurality of accessed message storage nodes for storage of an inbound message, wherein said inbound message is directed to at least one user, said selecting step determining a storage capacity for said storage nodes to select a next available storage node in said access sequence for storage of said inbound message;
  storing information identifying one or more users to which said inbound message is directed and information identifying a particular storage node selected for storage of said inbound message; and
  consolidating a selected user's messages to one or more designated storage nodes according to a statistical usage summary for said selected user.

17. The method set forth in claim 16, further comprising the step of:
  storing information packet within said next available storage node.

18. The method set forth in claim 17, wherein storage of inbound messages results in a statistical distribution of messages across said plurality of message storage nodes over time.

19. The method set forth in claim 17, wherein storage of inbound messages results in a statistical distribution of said inbound messages across an available bandwidth of the system over time.

20. The method set forth in claim 17, further comprising the step of:
  retrieving messages from said plurality of storage nodes.

21. The method set forth in claim 20, wherein said retrieving step utilizes information stored by said storing identifying information step to retrieve said messages.

22. The method set forth in claim 16, wherein said access sequence defines a round robin sequence of said plurality of storage nodes.

23. The method set forth in claim 16, wherein said access sequence references each one of said plurality of storage nodes an equal number of times.

24. The method set forth in claim 23, wherein said access sequence references particular ones of said plurality of storage nodes a disproportionate number of times.

25. The method set forth in claim 23, wherein said access sequence is established at least in part by a physical location of particular nodes of said plurality of nodes.

26. The method set forth in claim 16, wherein said consolidating step is operable for consolidation of messages directed to each user of said plurality of users.

27. The method set forth in claim 16, wherein said consolidating step is operable for consolidation of messages directed to predetermined users of said plurality of users.

28. The method set forth in claim 16, wherein said consolidating step operates real-time as a background task of said system, said background task being operable as system utilization permits.

29. The method set forth in claim 16, wherein said consolidating step operates offline.

30. The method set forth in claim 16, wherein said consolidating step comprises the substeps of:
  detecting an initiation and a termination of access to said message storage nodes, said detecting step measuring a duration of each said access and recording a time of day for each said access;
  generating a statistical usage summary for each user of said plurality of users and for each said message storage node at least in part as a function of information from said detecting step; and
  storing said statistical usage summary for each user of said plurality of users and for each said message storage node.

31. The method set forth in claim 30, wherein said consolidating step further comprises the step of:
  selecting at least one node of said plurality of message storage nodes at least in part as a function of said stored statistical summary.

32. A system for storing messages for a plurality of users, said system comprising:
  means for receiving an inbound message;
  means for identifying a rank of ones of a plurality of message storage nodes, said rank defining an order of storage access for each one of said plurality of message storage nodes;
  means for selecting one or more of said plurality of message storage nodes for storage of said inbound message, said selecting means operable with said rank to select said one or more storage nodes as a function of a next available storage node of said plurality of message storage nodes;
  means for storing said inbound message on said one or more of said selected storage nodes; and
  means for consolidating messages directed to a particular user of said system stored on a plurality of message storage nodes to at least one node of said plurality of message storage nodes according to a statistical usage summary for said particular user.

33. The system set forth in claim 32, wherein storage of a plurality of said inbound messages results in a substantially uniform utilization of said plurality of message storage nodes over time.

34. The system set forth in claim 32, wherein said rank includes a single reference to each one of said plurality of storage nodes.

35. The system set forth in claim 34, wherein said rank includes multiple references to a particular one of said plurality of storage nodes.

36. The system set forth in claim 35, wherein said means for identifying said rank determines said order of storage access at least in part by a relative geographic proximity of particular ones of said plurality of nodes.

37. The system set forth in claim 34, wherein said means for identifying a rank determines said order of storage access at least in part by a determination of an efficient use of a means for information communication among said storage nodes.

38. The system set forth in claim 37, further comprising:
  means for storing information identifying a particular user to which said inbound message is directed, said storing means also for storing information identifying said selected one or more storage nodes said inbound message is stored on.

39. The system set forth in claim 32, wherein said consolidating means is operable for consolidation of messages directed to each user of said plurality of users.

40. The system set forth in claim 32, wherein said consolidating means is operable for consolidation of messages directed to predetermined users of said plurality of users.

41. The system set forth in claim 32, wherein said consolidating means operates as a background task of said system, said background task being operable as system utilization permits.

42. The system set forth in claim 32, wherein said consolidating means comprises:

means for determining storage capacity available on ones of said plurality of message storage nodes; and means for selecting said at least one node of said plurality of message storage nodes operable with said storage capacity determining means.

43. The system set forth in claim 32, wherein said consolidating means comprises:

means for detecting an initiation and a termination of access to said message storage nodes, said detecting means measuring a duration of each said access and recording a time of day for each said access, thereby generating a statistical usage summary for each user of said plurality of users and for each said message storage node; and means for storing said statistical usage summary for each user of said plurality of users and for each said message storage node.

44. The system set forth in claim 43, wherein said consolidating means further comprises:

means for selecting said at least one node of said plurality of message storage nodes operable with said statistical summary storage means.

45. The system set forth in claim 43, wherein said consolidating means is operable for consolidation of messages directed to select users of said plurality of users, said select users being selected in part by said statistical summary.

46. A system for retrieving information packets for a particular user from a plurality of storage nodes, said system comprising:

means for storing received information packets on selected ones of said storage nodes;

means for moving said stored information packets among said plurality of storage nodes so that said information packets associated with a particular user are located on a same storage node;

means for storing information identifying ones of said plurality of information packets associated with said particular user and identifying at least one particular node of said plurality of storage nodes on which said associated information packets are stored; and means for retrieving said information packets associated with a particular user according to a statistical usage summary for said particular user, said retrieving means operable with said information storing means to retrieve said information packets associated with a particular user regardless of which of said plurality of storage nodes said information packets are stored on.

47. The system set forth in claim 46, wherein said information packets are initially stored on said plurality of storage nodes according to a hierarchy of said plurality of storage nodes, wherein said hierarchy defines an order of said plurality of storage nodes.

48. The system set forth in claim 47, wherein said means for storing said received information packets utilizes said hierarchy to access each one of said plurality of storage nodes at least once according to said order.

49. The system set forth in claim 47, wherein said hierarchy defines a round robin sequence of said plurality of nodes.

50. The system set forth in claim 47, wherein said hierarchy is determined at least in part by a physical location of a particular node of said plurality of nodes.

51. The system set forth in claim 46, wherein said moving means comprises:

means for determining a storage capacity available on ones of said plurality of storage nodes; and means for selecting said at least one of said plurality of storage nodes having a sufficient storage capacity.

52. The system set forth in claim 46, wherein said moving means is operable for each user of said plurality of users.

53. The system set forth in claim 46, wherein said moving means is operable only for predetermined users.

54. The system set forth in claim 46, wherein said moving means comprises:

means for detecting an initiation and a termination of access to said storage nodes, said detecting means measuring a duration of each said access and recording a time of day for each said access, thereby generating a statistical usage summary for each user of said plurality of users and for each said message storage node; and means for storing said statistical usage summary for each user of said plurality of users and for each said message storage node.

55. The system set forth in claim 54, wherein said moving means further comprises:

means for selecting said at least one node of said plurality of storage nodes based upon said statistical usage summary.

56. A method for storing a plurality of messages and retrieving particular messages of said plurality of stored messages, said particular messages associated with a particular user, said plurality of messages stored on a plurality of message storage nodes, said method comprising the steps of:

receiving an inbound message;

determining an availability of ones of said plurality of message storage nodes for message storage operations;

determining a hierarchy of ones of said plurality of message storage nodes, said hierarchy defining a sequence of information communication with each one of said plurality of message storage nodes;

selecting a particular message storage node of said plurality of message storage nodes for storage of said inbound message, said selecting step operable with said availability determining step and said hierarchy to select a next available storage node in said hierarchy for storage of said inbound message;

storing said inbound message on said selected message storage node;

consolidating messages associated with said particular user from a plurality of message storage nodes to at least one node of said plurality of message storage nodes according to a statistical usage summary for said particular user; and retrieving said consolidated messages for a particular user.

57. The method set forth in claim 56, wherein said storing step utilizes said hierarchy to access each one of said plurality of storage nodes at least once according to said sequence.

58. The method set forth in claim 57, wherein said hierarchy is determined at least in part by a physical location of a particular node of said plurality of nodes.

59. The method set forth in claim 56, wherein said consolidating step is operable for consolidation of messages directed to each user of a plurality of users.

60. The method set forth in claim 56, wherein said consolidating step is operable for consolidation of messages directed to predetermined users of a plurality of users.

61. The method set forth in claim 56, wherein said consolidating step operates real-time as a background task of said system, said background task being operable as system utilization permits.

62. The method set forth in claim 56, wherein said consolidating step operates offline.

63. The method set forth in claim 56, wherein said consolidating step comprises the substeps of:

determining a storage capacity available on ones of said plurality of message storage nodes; and selecting said at least one node of said plurality of message storage nodes having a sufficient capacity to store messages for a particular user.

64. The method set forth in claim 56, wherein said consolidating step comprises the substeps of:

detecting an initiation and a termination of access to said message storage nodes, said detecting means measuring a duration of each said access and recording a time of day for each said access, thereby generating said statistical usage summary for each user of said plurality of users and for each said message storage node; and storing said statistical usage summary for each user of said plurality of users and for each said message storage node.

65. The method set forth in claim 64, wherein said consolidating step further comprises the step of:

selecting said at least one node of said plurality of message storage nodes operable with said statistical summary storage means.

66. The method set forth in claim 64, wherein said consolidating step is only operable for consolidation of messages directed to particular users of said plurality of users, said particular users identified in part by said statistical summary.

* * * * *